Reissued June 12, 1934 Re. 19,207

UNITED STATES PATENT OFFICE 19,207

OLEFIN-POLYSULPHIDE PLASTIC

Joseph C. Patrick, Trenton, N. J.

No Drawing. Original No. 1,950,744, dated March 13, 1934, Serial No. 393,830, September 19, 1929. Application for reissue April 17, 1934, Serial No. 720,953

26 Claims. (Cl. 260—6)

The present invention relates to improvements in olefin-polysulphide plastics and more particularly in the type of plastic described in my prior application 239,808, filed December 13, 1927.

In accordance with the present invention, I am able to secure the plastic product of reaction and particularly the soft-type products corresponding to polysulphides of the formula $RS_3$ to $RS_{3.5}$ and higher proportions of sulphur, in a form such that the product may be readily and rapidly washed free from inorganic salts and other undesirable constituents, and an improved product is secured.

Furthermore, by operating in accordance with the present invention, I am able to secure the olefin-polysulphide plastic, and particularly the soft-type plastic above referred to, in the form of an aqueous dispersion or latex, which can be readily purified, and from which the plastic material may be coagulated, either with or without the previous incorporation into the latex of desired compounding or stabilizing constituents. In addition, by securing the plastic material in a dispersed condition as a latex, I am enabled to coat or impregnate fabrics, textiles and various absorbent and non-absorbent bodies with the latex and subsequently cause the coagulation in situ of the desired plastic bodies.

In carrying out the present invention, I cause the plastic or reaction body to be formed in the presence of a suitable dispersing agent, while maintaining a hydroxyl ion concentration equal to or greater than that existing in a saturated solution of freshly precipitated magnesium hydroxide. As suitable dispersing agents, I may employ precipitated magnesium hydroxide, or aqueous dispersions of peptized starch, gelatin, glue, blood-albumen, egg-albumen, or the like. In general I prefer to employ freshly precipitated magnesium hydroxide in carrying out the reaction.

As pointed out in my prior application above referred to, the plastic material may be produced by reaction between an olefin-dihalide and a water-soluble polysulphide having the desired sulphur content, the reaction being quantitative. Ordinarily an excess of one of the reaction constituents is desired, and since the polysulphide is the least expensive reagent, it is preferred that there be an excess of the polysulphide present. The polysulphide employed may be previously stabilized by heating for a period such that homogeneity is secured, as set forth in my prior application 369,912, filed June 10, 1929, and the conditions of reaction, particularly as to temperature, may be controlled by the addition of alcohols as disclosed in said application. Thus, when used, the proportion of alcohol may vary from 10 to 80% by volume. Where such control is not desired, the alcohol may be omitted.

The invention may be illustrated by the following examples:

1. An aqueous solution of calcium polysulphide is prepared, having a density of 31° Bé., the empirical formula of which is, by analysis, $CaS_{4.7}$. Magnesium hydroxide is formed in this solution, preferably by the addition of a solution of sodium hydroxide, followed by a solution of magnesium chloride or sulphate, or other suitable compound. The amount of magnesium hydroxide may vary within quite wide limits say from 2 to 50 grams per thousand cubic centimeters of the polysulphide solution. Preferably from 5 to 10 grams per liter provides a desirable form of latex-like dispersion of the final product best adapted for handling. Thus, to each 1000 cubic centimeters of the above calcium polysulphide solution, there may be added 50 cubic centimeters of a solution containing 290 grams sodium hydroxide per liter and 100 cubic centimeters of a solution of magnesium chloride containing the chemical equivalent of 105 grams of magnesium hydroxide per liter, these proportions providing a slight excess of sodium hydroxide. A semi-gelatinous dispersion of magnesium hydroxide in the polysulphide solution results. If desired, the magnesium hydroxide suspension may be formed separately and added to the polysulphide solution, but preferably the suspension is formed in the solution itself, as hereinbefore described.

The desired olefin-dihalide, for example, ethylene dichloride, is now added to the polysulphide solution containing the dispersed magnesium hydroxide, the proportion of dihalide added being very slightly less than the equivalent required for reaction. Thus, with the solution above described, 157 cubic centimeters of ethylene dichloride per liter of original calcium polysulphide solution is used. To avoid excessive heating, the olefin-dihalide is added in small portions with vigorous agitation. If desired, the polysulphide solution may first be slightly warmed, say to 80 to 100° F., to accelerate the beginning of the reaction. The addition of ethylene dichloride is controlled so that the temperature does not rise excessively, say to above 150 to 175° F. After the dihalide has been completely added, the reaction may be completed by further warming the mixture to, say, 175 to 190° F. for a short period, until complete disappearance of the olefin-dihalide is indicated by loss of its odor. The olefin-polysulphide plastic forms in this reaction mixture as a fluid dispersion, latex-like in character, which settles out of the reaction mixture. The supernatant solution may be removed by decantation and the latex-like dispersion may be readily washed with water and settled, the wash water being decanted. This is repeated until the soluble salts and other undesirable constituents present are completely removed. This latex may then be coagulated or compounded and coagulated, as hereinafter set forth.

II. A stabilized sodium polysulphide solution of empirical formula $Na_2S_4$, and of density 37.0° Bé. at 60° F. is formed by dissolving sulphur in a solution of sodium hydroxide in the requisite proportions and heating the mixture to atmospheric pressure boiling point for a substantial period of time, say 20 hours, as disclosed in my prior application Serial No. 369,912 above referred to. Dispersed magnesium hydroxide is formed in this polysulphide solution in the same manner and suitably in the same proportions as set forth in connection with the first example above. The mixture is then heated to 120° F., and slightly less than equivalent quantity of ethylene dichloride is added in small portions at a time with vigorous agitation, while holding the temperature of the mixture below about 175° F. The amount of ethylene dichloride so added is about 208 grams per liter of the original polysulphide solution. The latex of olefin-polysulphide plastic forms and is settled and separated from the other products of reaction by decantation or centrifuging, thoroughly washed as in the first example and is then ready for coagulating or compounding and coagulating.

The latex-like dispersion of the olefin-polysulphide plastic produced in accordance with the method of the present invention may be coagulated by acidifying it with any suitable acid, such as hydrochloride or sulphuric acid, or organic acids such as acetic acid, formic acid, or the like; and on acidulation, the olefin-polysulphide plastic coagulates to form an elastic, spongy mass, from yellow to white or nearly white in color. The coagulum has the characteristics of the soft plastic described in my prior applications above referred to, being pliable and resembling in appearance soft vulcanized rubber. Its characteristics may be improved by incorporating into it, suitably on a rubber mill, any desirable proportion of a metallic oxide such as litharge, zinc oxide, magnesium oxide or other compounds of the class of sulphur carriers well known in the rubber industry. Various inert materials, such as those of the type used in compounding rubber, for example, fibers, wood flour, carbon black, glue, asbestos, and the like, may be compounded with the latex either with or without the sulphur carrier. The compound may then be suitably heated to effect its stabilization, the time of heating varying with the temperature employed. Temperatures from 80° C. upwards may be used. Thus, by heating in autoclave under 40 lbs. steam pressure for 40 minutes to 1 hour, a completely stable and homogeneous product may be secured. Instead of first coagulating the latex and incorporating a sulphur carrier and other compounding ingredients into the coagulum, such materials may be incorporated in the latex before coagulation. Thus, from 1 to 10% of litharge or zinc oxide may be thoroughly mixed with a thick latex, the mixture then heated (as it does not undergo coagulation on heating) under the same conditions as set forth in connection with the compound above, and the heated and stabilized mixture then coagulated. Other compounding ingredients may be incorporated in the latex for such heating and coagulation, or if desired, after the stabilized latex-sulphur carrier mixture has been coagulated, additional compounding ingredients may be milled into the coagulum in the ordinary manner.

The resulting product has the characteristics of a soft unvulcanized rubber, does not flow under pressure, is not separable by organic solvents; it is not affected or swelled by organic rubber solvents, including carbon disulphide, and has dielectric qualities superior to those of rubber. Furthermore, it completely resists the action of oils, salt water and the like, and has an extremely low power loss when used as a dielectric.

The latex of the olefin-polysulfide plastic is stable and may be preserved and stored as such, or may be treated with a sulphur carrier, as hereinbefore set forth, and the stabilized latex preserved and stored for further use. If the latex is stored for periods of a week or more, it may undergo a change somewhat analogous to polymerization. The addition of an acid then produces the subsidence of a granular product from the liquid. The latex can, however, be restored to its original condition by subjecting the dispersion, before adding the acid, to temperatures around the boiling point of water for a few minutes, the addition of the proper amount of acid will then produce the massive coagulum.

The present method of operation is particularly desirable in the manufacture of the soft-type of olefin-polysulphide plastic and those approaching the soft-type; that is, corresponding to the polysulphides of the formula $RS_3$ to $RS_{3.5}$ and upwards. It may also be employed in the production of olefin-polysulphide plastics of lower sulphur content in securing dispersed products but as the proportions of sulphur decrease, the resulting product loses its latex-like character and assumes a more granular, pulverulent character, as in the process described in my prior application Serial No. 369,912 hereinbefore referred to.

As pointed out in my prior application, a wide range of olefin-dihalides may be employed in carrying out the reaction, as well as dihalides of mixtures of olefins such as are secured by the formation of unsaturated hydrocarbon gases derived from pressure cracking processes, natural gas cracking processes, and the like. Furthermore, as also disclosed in my prior applications, a wide range of soluble polysulphides may be employed in securing the reaction products.

I claim:

1. The method of producing an olefin-polysulphide plastic in dispersed form, which comprises reacting upon an olefin-dihalide with a solution of a water soluble polysulphide in the presence of a dispersing agent from the group including magnesium hydroxide and dispersions of peptized starch, gelatin, glue, blood-albumen, egg albumen and the like while maintaining an alkalinity at least equal to that existing in a saturated solution of freshly precipitated magnesium hydroxide.

2. The method of producing an organic polysulphide plastic which comprises reacting upon an olefin-dihalide with a solution of a water-soluble polysulphide in the presence of magnesium hydroxide, thereby forming a latex-like dispersion of organic polysulphide bodies.

3. The method of producing an organic polysulphide plastic, which comprises reacting upon ethylene dihalide with a solution of a water soluble polysulphide in the presence of magnesium hydroxide, thereby forming a latex-like dispersion of an organic polysulphide body.

4. The method of producing an organic polysulphide plastic which comprises reacting upon a mixture of dihalides of gaseous olefin hydrocarbons with a solution of a water-soluble polysulphide in the presence of magnesium hydroxide, thereby forming a latex-like dispersion of an organic polysulphide body.

5. The method of forming a soft olefin-polysulphide plastic in latex-like dispersion which comprises reacting upon an olefin-dihalide with an aqueous solution of a polysulphide having a formula $RS_n$, wherein $n$ is at least 3 and R is the equivalent of two monovalent positive radicals in the presence of a dispersing agent from the group including magnesium hydroxide and dispersions of peptized starch, gelatin, glue, blood-albumen, egg albumen and the like, while maintaining a hydroxyl ion concentration at least equal to that existing in freshly precipitated magnesium hydroxide.

6. The method of producing a soft olefin-polysulphide plastic in latex-like dispersion wherein an olefin-dihalide is reacted upon with an aqueous solution of a polysulphide of formula $RS_n$ wherein $n$ is at least 3 and R is the equivalent of two monovalent positive radicals in the presence of freshly precipitated magnesium hydroxide.

7. The method of forming a soft olefin-polysulphide plastic in the form of a latex-like dispersion, which comprises incorporating a dispersing agent from the group including magnesium hydroxide and dispersions of peptized starch, gelatin, glue, blood-albumen, egg-albumen and the like into an aqueous solution of a polysulphide of formula $RS_n$ wherein $n$ is 3 or higher and R is the equivalent of two monovalent positive radicals, and admixing an olefin-dihalide with said solution.

8. The method of producing a soft olefin-polysulphide plastic in latex-like dispersion, which comprises dispersing magnesium hydroxide in an aqueous solution of a polysulphide of formula $RS_n$ wherein $n$ is at least 3 and R is the equivalent of two monovalent positive radicals, admixing an olefin-dihalide therewith and warming to cause reaction therebetween, whereby a latex-like dispersion of a soft olefin-polysulphide plastic is secured.

9. The method of producing a soft olefin-polysulphide plastic, which comprises forming dispersed magnesium hydroxide in an aqueous solution of a polysulphide of formula $RS_n$, wherein $n$ is at least 3 and R is the equivalent of two monovalent positive radicals, and adding an olefin-dihalide thereto, whereby the olefin-polysulphide plastic is formed in latex-like dispersion.

10. The method of producing a soft olefin-polysulphide plastic which comprises reacting upon a polysulphide containing a proportion of sulfur adapted to produce a soft-type plastic, while in aqueous solution, with an olefin-dihalide in the presence of a dispersing agent from the group including magnesium hydroxide and dispersions of peptized starch, gelatin, glue, blood albumen, egg albumen and the like forming a latex-like dispersion of the reaction product, removing soluble impurities from said latex, and coagulating the latex.

11. The method of producing a soft-type olefin-polysulphide plastic which comprises incorporating a suitable dispersing agent from the group including magnesium hydroxide and dispersions of peptized starch, gelatin, glue, blood-albumen, egg albumen and the like in an aqueous solution of a polysulphide of the general formula $RS_n$, wherein $n$ is at least 3 and R is the equivalent of two monovalent positive radicals, reacting thereupon with an olefin-dihalide, thereby forming a latex-like dispersion of the olefin polysulphide plastic, washing said latex to remove soluble impurities therefrom and acidifying the latex, thereby causing coagulation of the plastic.

12. The method of producing an olefin-polysulphide plastic, which comprises reacting with an olefin-dihalide upon a polysulphide of formula $RS_n$, wherein $n$ is at least 3 and R is the equivalent of two monovalent positive radicals, in aqueous solution, in the presence of a dispersing agent from the group including magnesium hydroxide and dispersions of peptized starch, gelatin, glue, blood albumen, egg albumen, and the like while maintaining an alkalinity at least equal to that existing in a saturated solution of freshly precipitated magnesium hydroxide, thereby forming a latex-like dispersion of an olefin-polysulphide plastic, washing said latex and acidulating the washed latex, thereby precipitating the olefin polysulphide plastic.

13. The method of forming a soft-type olefin-polysulphide plastic, which comprises reacting with an olefin-dihalide upon an aqueous solution of a polysulphide of formula $RS_n$, wherein $n$ is at least 3 and R is the equivalent of two monovalent positive radicals, in the presence of a solution of freshly precipitated magnesium hydroxide, thereby forming a latex-like dispersion of the plastic, separating and washing said latex, and acidulating the latex, thereby coagulating the plastic.

14. A latex-like dispersion of a soft-type olefin-polysulphide plastic, the type formula of the olefin being $C_nH_{2n}$.

15. A latex-like dispersion of an olefin-polysulphide plastic having a sulphur content corresponding to a polysulphide of the formula $RS_n$, wherein $n$ is at least 3 and R is the equivalent of two monovalent positive radicals.

16. A latex-like dispersion of an organic polysulphide derivative produced by the action of an olefin dihalide on a water soluble polysulphide of the formula $RS_n$, wherein $n$ is at least 3 and R is the equivalent of two monovalent positive radicals, said dispersion containing precipitated magnesium hydroxide as the dispersing agent.

17. A latex-like dispersion of an organic polysulphide derivative produced by the action of ethylene dihalide on a water-soluble polysulphide of the formula $RS_n$, wherein $n$ is at least 3 and R is the equivalent of two monovalent positive radicals, said dispersion containing precipitated magnesium hydroxide as the dispersing agent.

18. A latex-like dispersion of an organic polysulphide derivative produced by the action of a mixture of dihalides of gaseous olefins on a water-soluble polysulphide of the formula $RS_n$, wherein $n$ is at least 3 and R is the equivalent of two monovalent positive radicals, said dispersion containing precipitated magnesium hydroxide as the dispersing agent.

19. A latex-like dispersion of an ethylene-polysulphide having a sulphur content corresponding to a polysulphide of the formula $RS_n$, wherein $n$ is at least 3 and R is the equivalent of two monovalent positive radicals.

20. A latex-like dispersion of an organic polysulphide plastic produced by the action of a mixture of dihalides of gaseous olefins on a water-soluble polysulphide of the formula $RS_n$, wherein $n$ is at least 3 and R is the equivalent of two monovalent positive radicals.

21. A composition comprising an admixture of a latex-like dispersion of a soft-type olefin-polysulphide plastic and compounding ingredients.

22. A composition comprising an intermixture of a latex-like dispersion of a soft-type olefin-polysulphide plastic and a sulphur carrier.

23. A composition comprising an intermixture of a latex-like dispersion of a soft-type olefin-polysulphide plastic and a sulphur carrier, said composition being stabilized by heat.

24. A composition comprising an intermixture of a latex-like dispersion of a soft-type olefin-polysulphide plastic and litharge.

25. A composition comprising an intermixture of a latex-like dispersion of an olefin-polysulphide plastic and litharge, said composition being stabilized by heat.

26. A composition comprising an intermixture of a latex-like dispersion of a soft-type olefin-polysulphide plastic, inert material, and a sulphur carrier.

JOSEPH C. PATRICK.